United States Patent
Eberhardt

(10) Patent No.: US 11,594,928 B2
(45) Date of Patent: Feb. 28, 2023

(54) SYSTEM AND METHOD FOR REPAIRING A GENERATOR MAIN LEAD

(71) Applicant: Siemens Energy, Inc., Orlando, FL (US)

(72) Inventor: Nicholas Eberhardt, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 93 days.

(21) Appl. No.: 17/242,846

(22) Filed: Apr. 28, 2021

(65) Prior Publication Data
US 2022/0247247 A1 Aug. 4, 2022

Related U.S. Application Data

(60) Provisional application No. 63/143,210, filed on Jan. 29, 2021.

(51) Int. Cl.
*H02K 3/24* (2006.01)
*H02K 7/18* (2006.01)
(Continued)

(52) U.S. Cl.
CPC ............... *H02K 3/24* (2013.01); *F01D 15/10* (2013.01); *H01R 43/002* (2013.01); *H01R 43/14* (2013.01);
(Continued)

(58) Field of Classification Search
CPC .......... H02K 3/24; H02K 3/22; H02K 7/1823; H02K 9/197; H02K 9/28; H02K 13/04;
(Continued)

(56) References Cited

U.S. PATENT DOCUMENTS 3,049,634 A * 8/1962 Horsley ................... H02K 3/22
310/64
3,075,104 A * 1/1963 Willyoung ............... H02K 3/22
310/64

(Continued)

OTHER PUBLICATIONS

Liquid Cooled Generator—Stator Winding Connection Ring Test, Repair and Upgrades (Year: 2016).*
(Continued)

*Primary Examiner* — Ahmed Elnakib

(57) ABSTRACT

A turbogenerator includes a stator core defining a first end and a second end, a plurality of stator bars disposed within the stator core, each stator bar including a coolant flow path, and a parallel ring having a first segment and a second segment separate from the first segment. The parallel ring is coupled to the first end of the stator core and is arranged to electrically connect the plurality of stator bars and to fluidly connect the coolant flow paths of the plurality of stator bars. A tang includes a main chamber, a first coolant opening, a second coolant opening, and a distribution channel that fluidly interconnects the main chamber, the first coolant opening, and the second coolant opening. A first lead tube has a first lead end connected to the first coolant opening and a second lead end connected to the first segment, and a second lead tube separate from the first lead tube has a first lead end connected to the second coolant opening and a second lead end connected to the second segment. The plurality of stator bars, the parallel ring, the tang, the first lead tube, and the second lead tube cooperate to define a portion of a circuit and a portion of a cooling path.

18 Claims, 6 Drawing Sheets

(51) Int. Cl.
| | |
|---|---|
| *F01D 15/10* | (2006.01) |
| *H02K 15/00* | (2006.01) |
| *H02K 9/197* | (2006.01) |
| *H02K 13/04* | (2006.01) |
| *H02K 15/02* | (2006.01) |
| *H01R 43/00* | (2006.01) |
| *H01R 43/14* | (2006.01) |
| *H02K 3/22* | (2006.01) |
| *H02K 9/28* | (2006.01) |

(52) U.S. Cl.
CPC ............. *H02K 3/22* (2013.01); *H02K 7/1823* (2013.01); *H02K 9/197* (2013.01); *H02K 9/28* (2013.01); *H02K 13/04* (2013.01); *H02K 15/0006* (2013.01); *H02K 15/0093* (2013.01); *H02K 15/02* (2013.01)

(58) Field of Classification Search
CPC ........... H02K 15/0006; H02K 15/0093; H02K 15/02; F01D 15/10; H01R 43/002; H01R 43/14
USPC ........................................................ 310/228
See application file for complete search history.

(56) References Cited

U.S. PATENT DOCUMENTS

| | | | | |
|---|---|---|---|---|
| 3,753,013 | A * | 8/1973 | Beermann | H02K 9/00 310/198 |
| 2002/0079773 | A1* | 6/2002 | Butman | H02K 3/22 310/201 |
| 2019/0020250 | A1* | 1/2019 | Eberhardt | H02K 3/521 |
| 2022/0247247 | A1* | 8/2022 | Eberhardt | H02K 3/24 |

OTHER PUBLICATIONS

Karl Tornroos, P.E., Dhruv Bhatnagar, Alan Iversen, et al. / Liquid Cooled Generator—Stator Winding Connection Ring Test, Repair and Upgrades; GE Power; Feb. 2016.

* cited by examiner

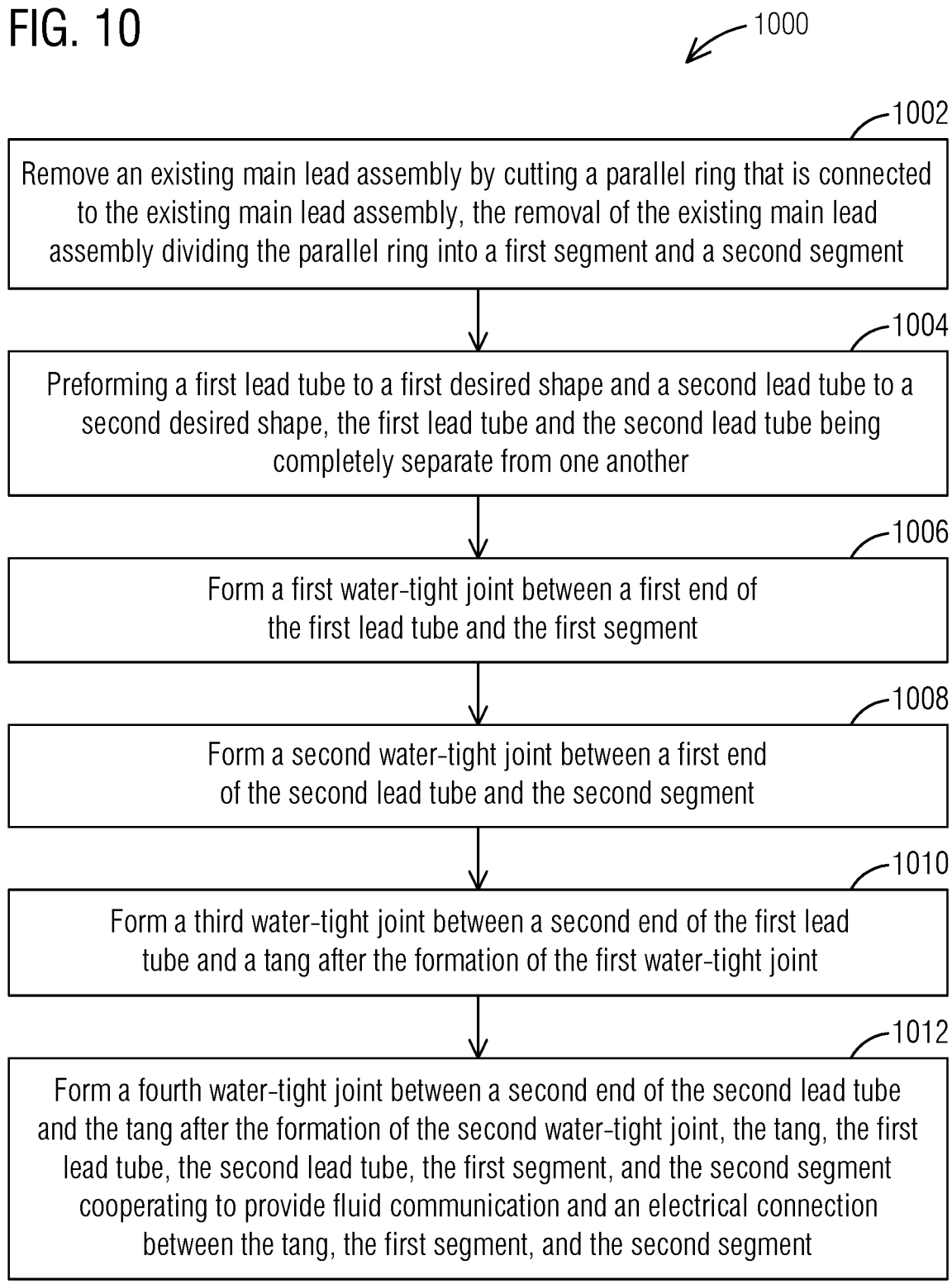

SYSTEM AND METHOD FOR REPAIRING A GENERATOR MAIN LEAD

BACKGROUND

Turbogenerators used for power generation often employ cooling systems to cool both the rotor and the stator of the generator. In some two-pole and four-pole generators, liquid or water cooling is used to cool the stator. The use and arrangement of the cooling for these generators often includes complicated flow paths and arrangements that are exposed to operating conditions that can lead to damage and leakage.

BRIEF SUMMARY

In one aspect, a turbogenerator includes a stator core defining a first end and a second end, a plurality of stator bars disposed within the stator core, each stator bar including a coolant flow path, and a parallel ring having a first segment and a second segment separate from the first segment. The parallel ring is coupled to the first end of the stator core and is arranged to electrically connect the plurality of stator bars and to fluidly connect the coolant flow paths of the plurality of stator bars. A tang includes a main chamber, a first coolant opening, a second coolant opening, and a distribution channel that fluidly interconnects the main chamber, the first coolant opening, and the second coolant opening. A first lead tube has a first lead end connected to the first coolant opening and a second lead end connected to the first segment, and a second lead tube separate from the first lead tube has a first lead end connected to the second coolant opening and a second lead end connected to the second segment. The plurality of stator bars, the parallel ring, the tang, the first lead tube, and the second lead tube cooperate to define a portion of a circuit and a portion of a cooling path.

In another aspect, a turbogenerator includes a main lead assembly including a tang, a first lead tube cooperating with the tang to define a first water-tight joint and a first free end. A second lead tube, separate from the first lead tube, cooperates with the tang to define a second water-tight joint and a second free end. The first free end is connectable to a first segment of a parallel ring and the second free end is connectable to a second segment of the parallel ring.

In another aspect, a method of repairing a water-cooled stator for a turbogenerator includes removing an existing main lead assembly by cutting a parallel ring connected to the existing main lead assembly, the removal of the existing main lead assembly dividing the parallel ring into a first segment and a second segment. The method further includes preforming a first lead tube to a first desired shape and a second lead tube to a second desired shape, the first lead tube and the second lead tube being completely separate from one another. The method also includes forming a first water-tight joint between a first end of the first lead tube and the first segment, forming a second water-tight joint between a first end of the second lead tube and the second segment, forming a third water-tight joint between a second end of the first lead tube and a tang after the formation of the first water-tight joint, and forming a fourth water-tight joint between a second end of the second lead tube and the tang after the formation of the second water-tight joint. The tang, the first lead tube, the second lead tube, the first segment, and the second segment cooperate to provide fluid communication and an electrical connection between the tang, the first segment, and the second segment.

BRIEF DESCRIPTION OF THE DRAWINGS

To easily identify the discussion of any particular element or act, the most significant digit or digits in a reference number refer to the figure number in which that element is first introduced.

FIG. 10 is a flowchart summarizing a method of repairing a main lead.

DETAILED DESCRIPTION

Figure 1:
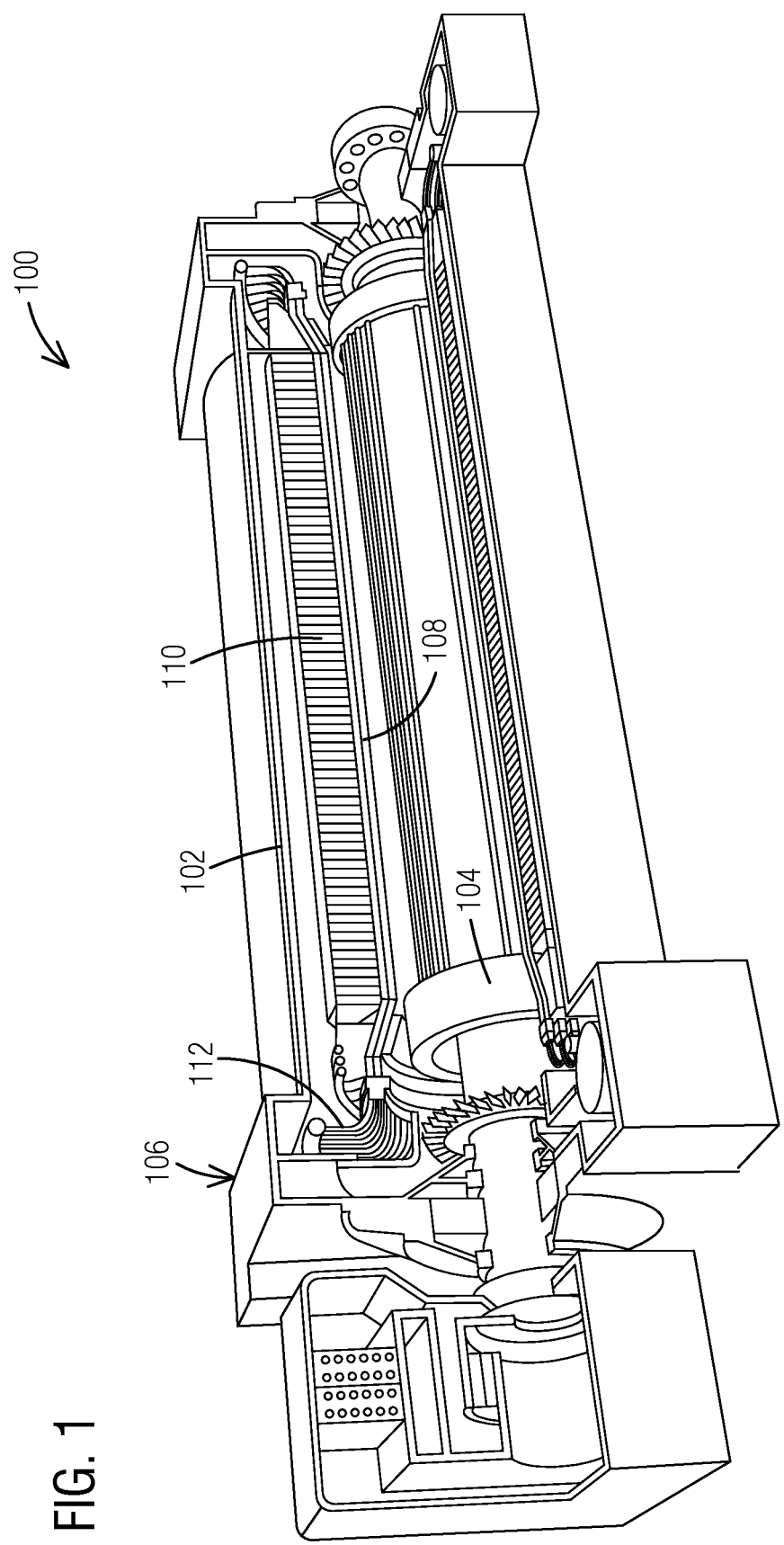
FIG. 1 is a partially broken away perspective view of a generator including a water-cooled stator.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates a turbogenerator 100 (sometimes referred to as a generator) of the type often used in large electrical generation facilities. The turbogenerator 100 is typically driven by a large prime mover such as a combustion turbine, a steam turbine, a hydro turbine and the like.

The turbogenerator 100 includes a stator 102 and a rotor 104 supported for rotation within the stator 102. The rotation of the rotor 104 with respect to the stator 102 generates an electrical current at a desired voltage. The illustrated turbogenerator 100 is a synchronous, 2-pole or a 4-pole generator that operates to generate three phase AC power at a desired frequency (e.g., 60 Hz in the United States, 50 Hz in Europe).

The stator 102 includes a stator core 110 that extends from a first end 106 to a second end opposite the first end 106. The stator core 110 is typically manufactured by stacking a plurality of laminations in a longitudinal direction with each lamination including any grooves, slots apertures or other features that extend along the length of the stator core 110. Once fully stacked, the stator core 110 defines a plurality of longitudinally extending slots that are each sized to receive one or more stator bars 108. The stator bar 108 extend the full length of the stator core 110 and in many cases extend beyond the stator core 110 where they connect to end turns or other components. In turn, the stator bars 108 are interconnected to define a series of coils or windings.

The stator bars 108 are electrically interconnected to define a desired circuit that provides the desired electrical output. For example, the stator bars 108 can be arranged to generate a single-phase output or a three-phase output. In addition, the stator bars 108 can be arranged to define a 3-phase delta circuit or a 3-phase Y-circuit as may be desired.

The large current flow and high voltage applied to the stator bars 108 results in significant heating within the turbogenerator 100. In many arrangements, both the rotor 104 and the stator 102 are cooled. In the illustrated construction, the rotor 104 is cooled by a gas such as hydrogen and the stator 102 is cooled using a liquid. Specifically, the stator 102 is a water-cooled stator 102. To facilitate water cooling, each of the stator bars 108 is hollow or defines a flow path that allows for the passage of water. Thus, the stator bars 108 serve as both electrical conductors and as coolant conduits for the stator 102.

The first end 106 of the stator 102 includes a connection assembly 112. The connection assembly 112 provides for the connection of a coolant or water supply that feeds and drains the various stator bars 108 and also provides for the main electrical connections to the stator 102.

Figure 2:
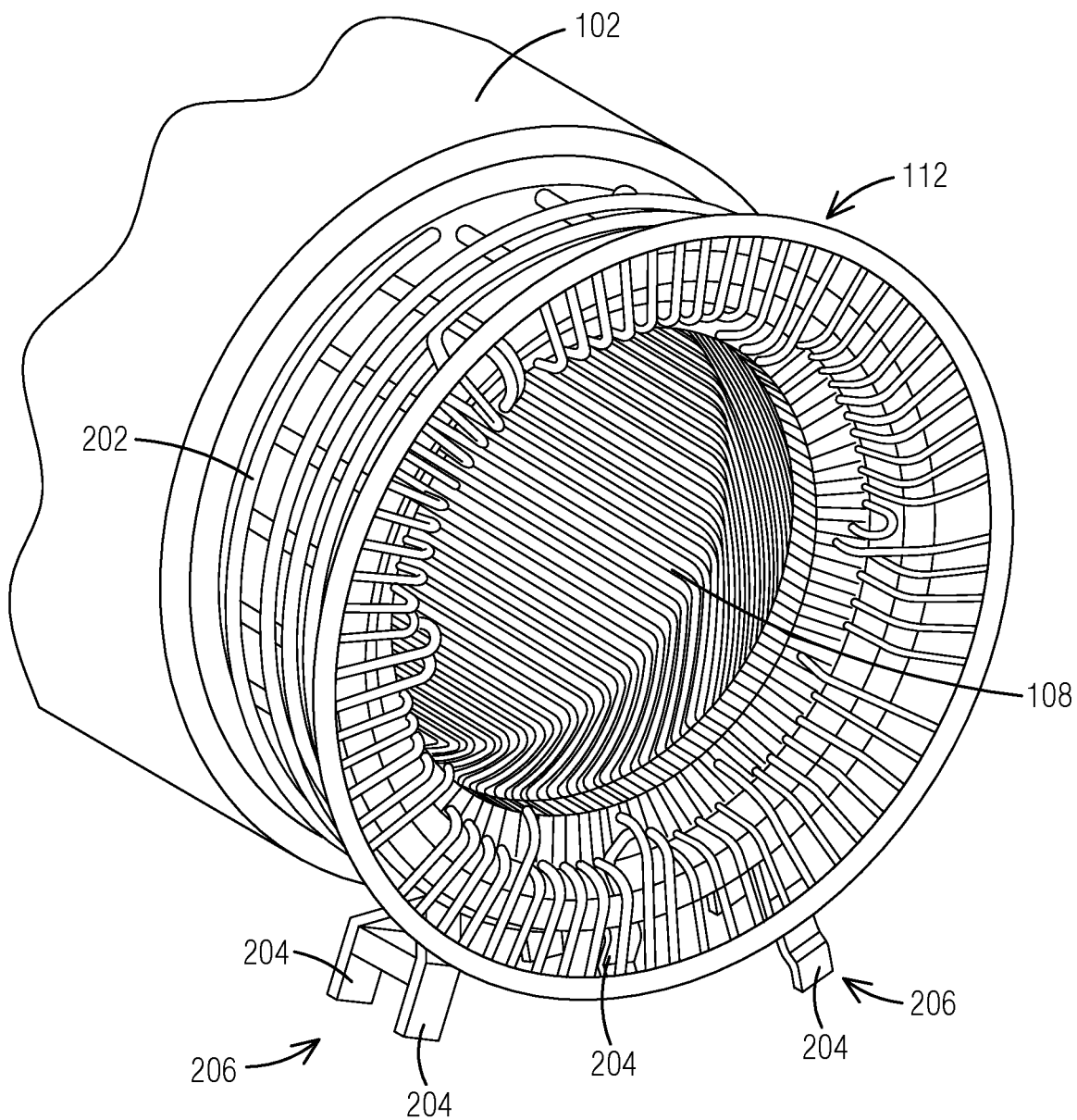
FIG. 2 is a perspective view of a first end of the stator of FIG. 1 better illustrating a number of parallel rings.

With reference to FIG. 2, the connection assembly 112 includes one or more parallel rings 202 and two or more main leads 204. The main leads 204 are arranged in phase pairs 206 with each phase pair 206 forming part of a complete electrical circuit for one of the phases of the turbogenerator 100.

In addition, the main leads 204 connect to one or more of the parallel rings 202 to distribute coolant (e.g., water) through the parallel rings 202 and to the individual stator bars 108 for cooling.

Figure 3:
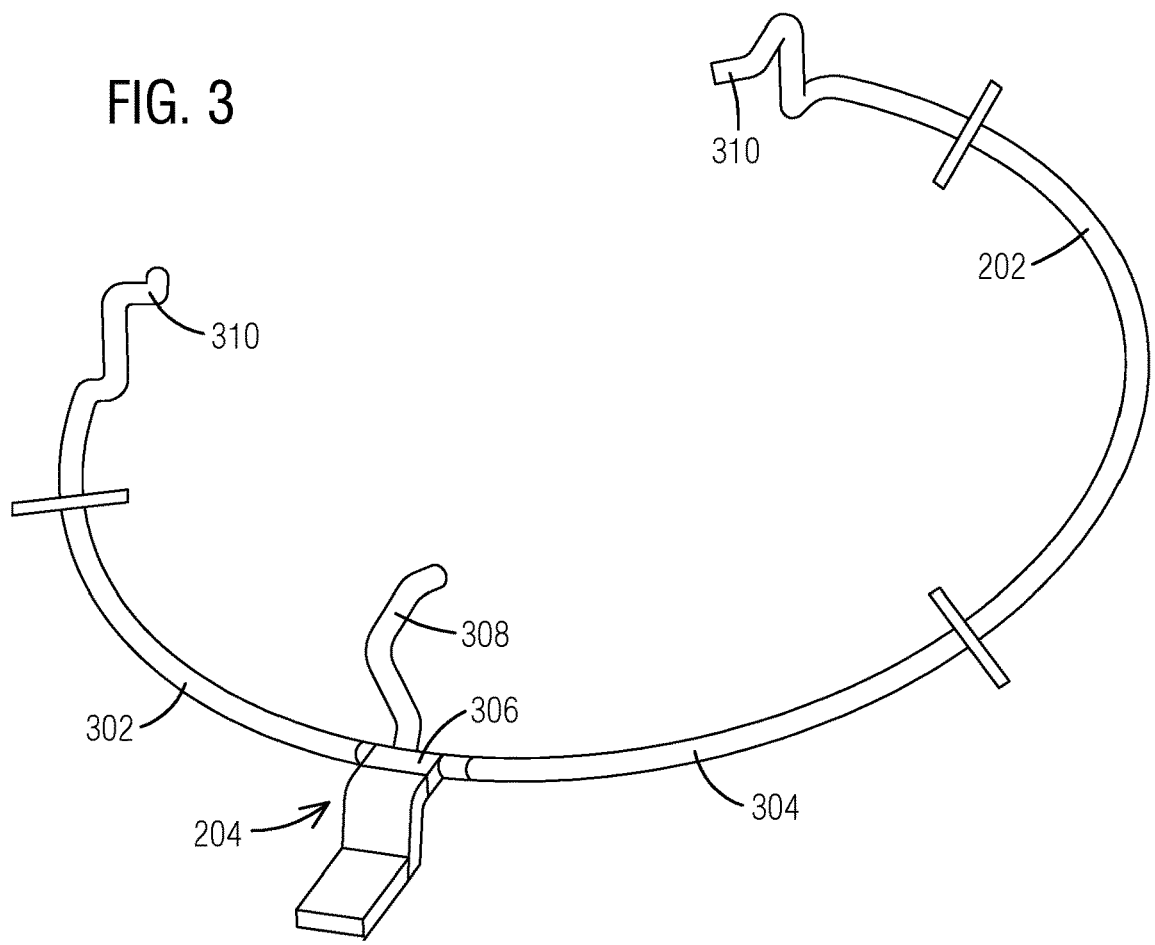
FIG. 3 is a perspective view of one of the parallel rings including a main lead.

FIG. 3 better illustrates the arrangement of one of the parallel rings 202 with a main lead 204 attached. The parallel ring 202 includes an arced portion that generally follows a circular arc with an end connector 310 at each end. The end connectors 310 can be arranged to connect to one of the stator bars 108 or can include a blind or capped end depending on the particular arrangement. In the illustrated construction, the parallel ring 202 is formed from a tubular copper or copper alloy member that is formed to the desired shape. The term "tubular" as used herein generally refers to a member having a circular cross section with a circular bore formed therein, thereby defining an annular wall. Other constructions could include other cross-sectional shapes for the tube so long as the tube includes an inner flow path or bore.

The main lead 204 is coupled to the parallel ring 202 such that the main lead 204 divides the parallel ring 202 into a first segment 302 and a second segment 304. The main lead 204 includes a lead adapter 306 that connects to the parallel ring 202 and facilitates the electrical connection between the remainder of the main lead 204 and the stator bars 108. The lead adapter 306 also directs coolant from the remainder of the main lead 204 into the parallel ring 202 and the stator bars 108 attached to the particular parallel ring 202.

In the illustrated construction, a lead tube 308 is attached to the lead adapter 306 and extends to a point where it can deliver coolant to another stator bar 108 or other component. In other constructions, more than one lead tube 308 could be attached to the lead adapter 306 or the lead tube 308 could be omitted. In some constructions, the lead tube 308 could be a segment similar to the first segment 302 or second segment 304 or could be an end connector 310.

It should be understood that FIG. 3 illustrates one possible arrangement of a parallel ring 202 and main lead 204. Other arrangements are possible and vary as may be required by the particular design or application.

Figure 4:
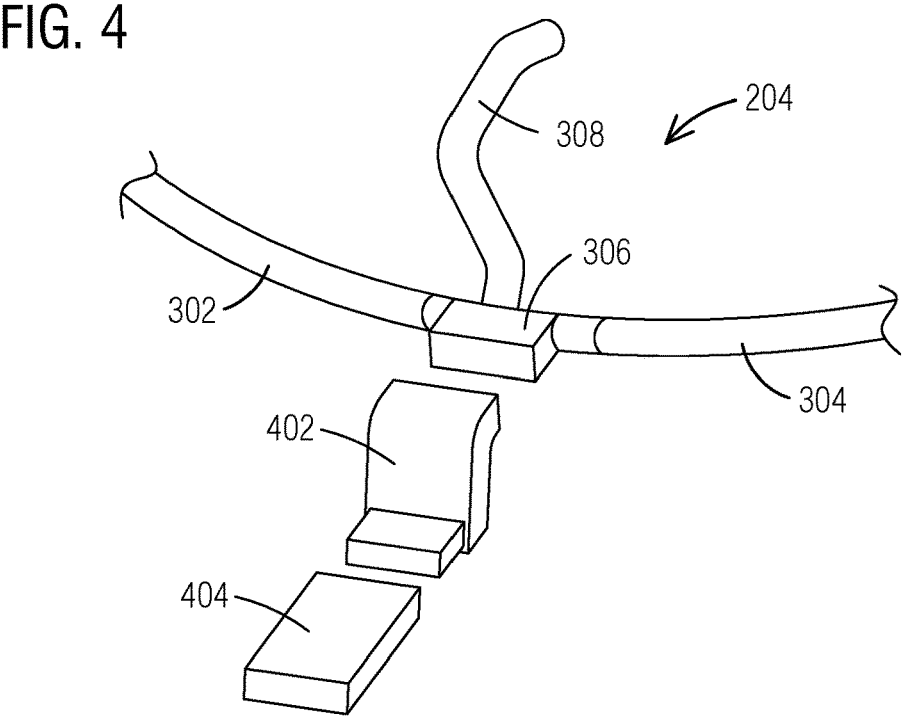
FIG. 4 is an enlarged perspective view of a main lead of FIG. 5.

FIG. 4 illustrates the main lead 204 positioned to divide the parallel ring 202 into the first segment 302 and the second segment 304. In the illustrated construction, the main lead 204 includes the lead adapter 306, a lead segment 402, and a lead plug 404. As described with regard to FIG. 3, the lead adapter 306 (sometimes referred to as the "pork chop") attaches to the first segment 302, the second segment 304, and in the construction of FIG. 4, the lead tube 308 to facilitate both the electrical connection as well as the delivery of a coolant flow. The lead segment 402 attaches to the lead adapter 306 and provides both an electrical connection between the lead adapter 306 and the lead plug 404 and a fluid connection. The lead segment 402 is contoured or shaped to fit into the space available in the turbogenerator 100 such that any number of shapes, sizes, or arrangements are possible. The lead plug 404 is sized and shaped to connect to the external or non-generator portion of the electrical circuit. In addition, many designs include a connection in the lead plug 404 for the supply of coolant to the stator bars 108 and/or parallel rings 202.

In the illustrated construction, the lead segment 402, the lead adapter 306, the lead tube 308, and the parallel ring 202 are wrapped with an electrical insulating material. In addition, the lead segment 402 and the lead adapter 306 are each single piece components that include separate bores or flow paths formed therein to facilitate the delivery of the coolant individually to the first segment 302, the second segment 304, and the lead tube 308 if present.

Figure 5:
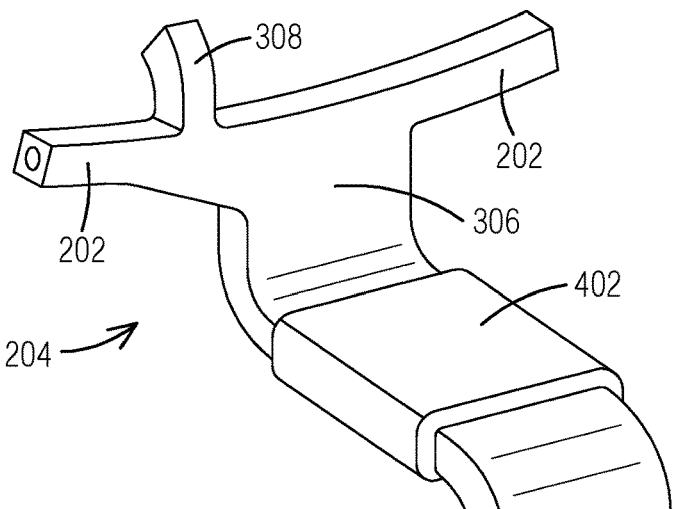
FIG. 5 is a perspective view of an arrangement for a main lead.

After operating for some time, it is possible for damage to occur to the main lead 204 or the components around the main lead 204 that require repair. FIG. 5 illustrates the main lead 204 of FIG. 4 after it has been removed from the parallel ring 202. To remove the main lead 204, the parallel ring 202 is cut on either side of the lead adapter 306, or on a single side in arrangements in which the lead adapter 306 is at an end of the parallel ring 202 and the lead plug 404 is disconnected from the lead segment 402. If any lead tubes 308 are attached to the lead adapter 306, those lead tubes 308 are cut as well.

Figure 6:
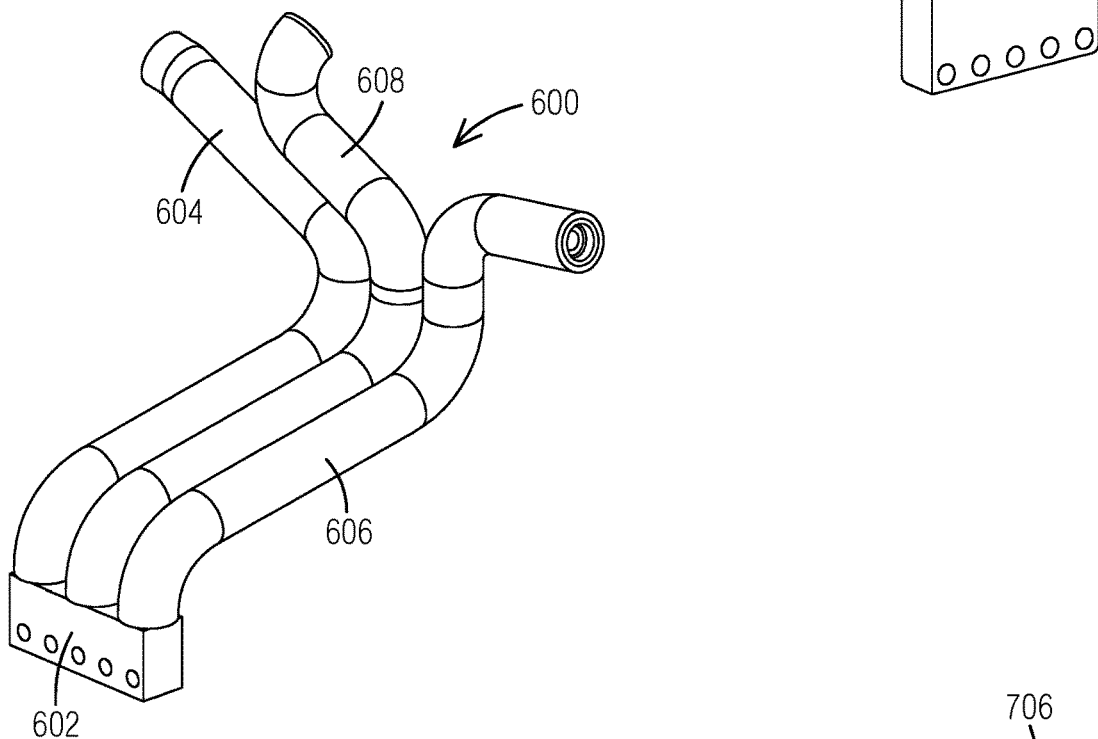
FIG. 6 is a perspective view of a main lead replacement suitable for replacing the main lead of FIG. 5.
Figure 7:
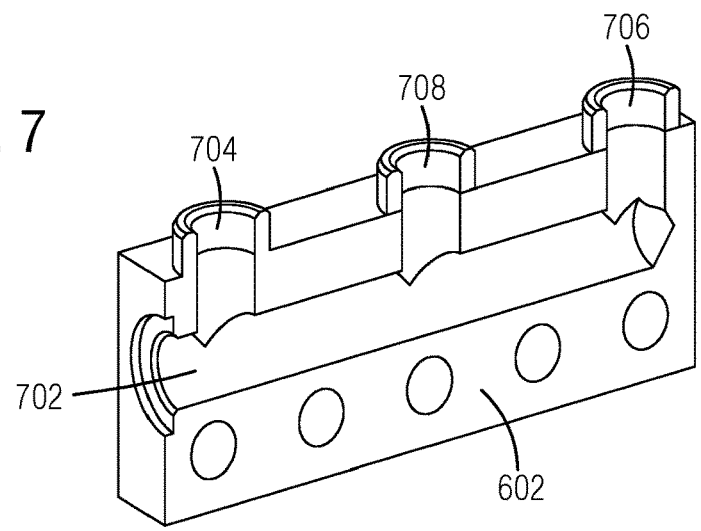
FIG. 7 is a section view of a portion of the main lead replacement of FIG. 6.

Once the main lead 204 is removed as illustrated in FIG. 5, it must be replaced to complete the repair of the turbogenerator 100. FIG. 6 illustrates a main lead assembly 600 suitable for use in replacing the main lead 204 of FIG. 5. The main lead assembly 600 includes a tang 602, a first lead tube 604, a second lead tube 606, and a third lead tube 608. The tang 602, best illustrated in FIG. 7 includes a body that defines a main chamber 702, a first coolant opening 704, a second coolant opening 706, and a third coolant opening 708. The main chamber 702 is sometimes in fluid communication with an opening that allows the tang 602 to either receive the flow of coolant or to discharge the flow of coolant, but in many situations is plugged. The main chamber 702 is in fluid communication with the first coolant opening 704, the second coolant opening 706, and the third coolant opening 708 to distribute or collect the coolant. In the illustrated construction, separate bosses extend from the body to at least partially define each of the first coolant opening 704, the second coolant opening 706, and the third coolant opening 708.

With reference to FIG. 6, each of the first lead tube 604, the second lead tube 606, and the third lead tube 608 is an annular cross-section tube formed in a desired shape. In the illustrated construction, each of the tubes has a circular cross-section and includes a circular bore with other shapes or arrangements being possible. The first lead tube 604 includes a first end that is arranged to be attached to the first segment 302 of the parallel ring 202 from which the main lead 204 was removed to define a first water-tight joint. Similarly, a first end of the second lead tube 606 is arranged to attach to the second segment 304 of the parallel ring 202 from which the main lead 204 was removed to form a second water-tight joint. A second end of the first lead tube 604 attaches to the tang 602 or the boss that surrounds the first coolant opening 704 of the tang 602 to form a third water-tight joint. A second end of the second lead tube 606 attaches to the tang 602 or the boss that surrounds the second coolant opening 706 of the tang 602 to define a fourth water-tight joint. The first lead tube 604 and second lead tube 606 are shaped to position their respective second ends in the proper positions to attach to the tang 602 with the tang 602 in a desired operating position.

The construction illustrated in FIG. 6 includes a third lead tube 608 that includes a first end that is connected to the parallel ring or other component to which the lead tube 308 was originally attached to define a fifth water-tight joint. A second end of the third lead tube 608 attaches to the tang 602 or the boss that surrounds the third coolant opening 708 of the tang 602 to define a sixth water-tight joint. The third lead tube 608 is shaped as required to engage the tang 602 with the tang 602 in the desired operating position.

Each of the first lead tube 604, the second lead tube 606, and the third lead tube 608 are wrapped with an insulation layer and positioned such that there is a space between the tubes. The term "space" is meant to convey that the tubes are separate and distinct components and that the insulation layers are applied to each tube separately such that the tubes can move independent of one another. Insulation layers that touch one another still have a space therebetween as that term is intended since the tubes can move with respect to one another.

As noted, other constructions may omit this third lead tube 608 or may include additional tubes that are connected in a manner similar to that just described.

Figure 8:
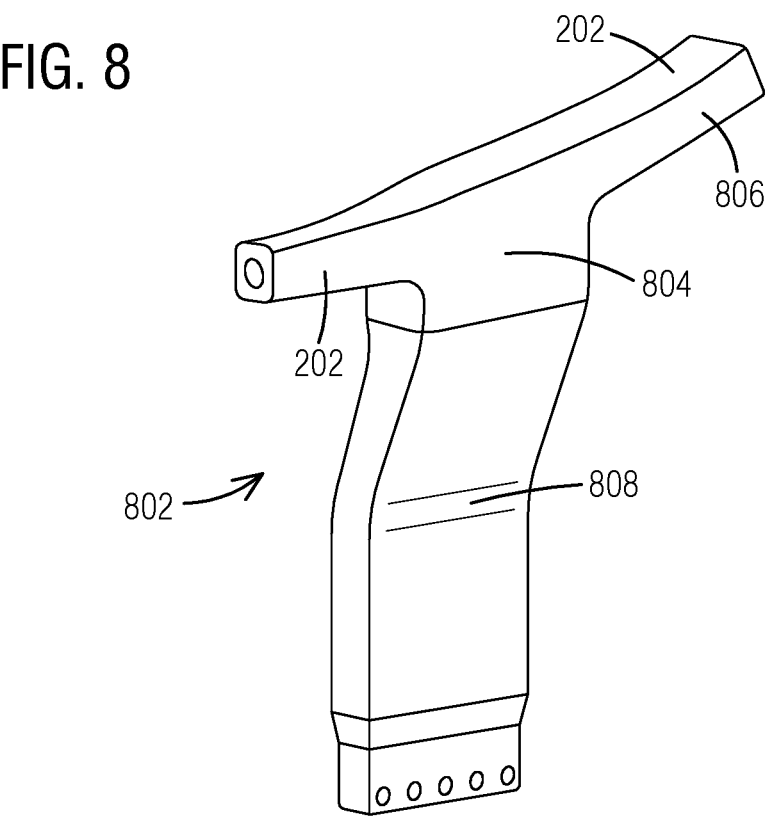
FIG. 8 is a perspective view of another arrangement for a main lead.

FIG. 8 illustrates another arrangement of an existing main lead 802 after it has been removed from a parallel ring 202. The main lead 802 includes the same components as the main lead 204 but many of them are shaped differently. Specifically, the main lead 802 includes a lead adapter 804 and a lead segment 808 that are arranged for a different position than those components of the main lead 204.

The main lead 802 is removed from the parallel ring 202 by cutting the parallel ring 202 on either side of the main lead 802. In addition, the main lead 802 includes a lead tube 806 similar to the lead tube 308 but extending in a different direction.

Figure 9:
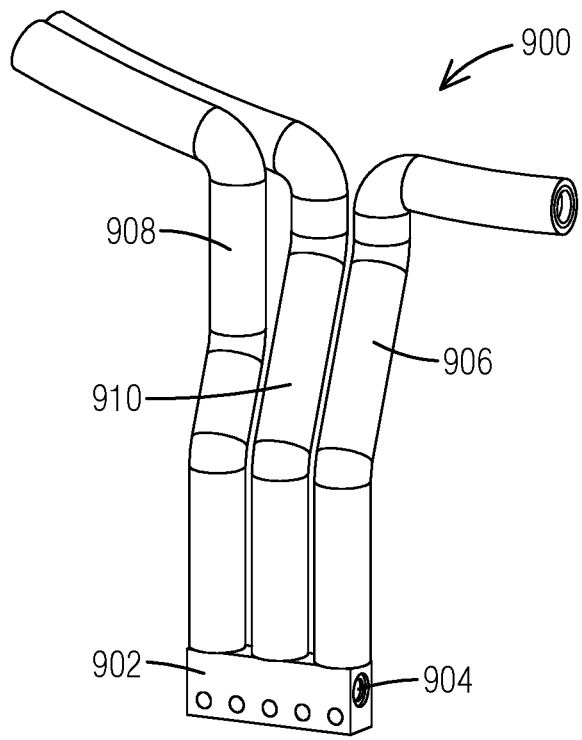
FIG. 9 is a perspective view of another main lead replacement suitable for replacing the main lead of FIG. 8.

FIG. 9 illustrates a main lead assembly 900 suitable for replacing the main lead 802 illustrated in FIG. 8. The main lead assembly 900 includes a tang 902 that defines a main opening 904. The tang 902 is very similar to the tang 602 and will not be described in greater detail.

The main lead assembly 900 includes a first lead tube 906, a second lead tube 908, and a third lead tube 910. The first lead tube 906 and the second lead tube 908 are similar to the first lead tube 604 and the second lead tube 606 already described and will not be described in detail. Additionally, the third lead tube 910 is similar to the third lead tube 608 with the exception of its shape or orientation. Rather than extending at an oblique or right angle with respect to the parallel ring 202, a first end of the third lead tube 910 extends in a direction that is substantially parallel to the parallel ring 202. This arrangement allows the third lead tube 910 to attach to an adjacent parallel ring or to some other component.

As with the construction of FIG. 6, each of the first lead tube 906, the second lead tube 908, and the third lead tube 910 is wrapped separately with a layer of insulation such that the tubes are free to move slightly with respect to one another. Of course, in some constructions some of the tubes may be insulated together.

FIG. 10 describes a method of repairing a main lead 1000 in a turbogenerator 100. In the first step 1002 one removes an existing main lead 204 by cutting a parallel ring 202 from the existing main lead 204. The removal of the existing main lead 204 divides the parallel ring 202 into a first segment 302 and a second segment 304. In another step 1004, the method of repairing a main lead 1000 includes preforming a first lead tube 604 to a first desired shape and a second lead tube 606 to a second desired shape, the first lead tube 604 and the second lead tube 606 being completely separate from one another. In a third step 1006, the method of repairing a main lead 1000 forms a first water-tight joint between a first end of the first lead tube 604 and the first segment 302. In a fourth step 1008, the method of repairing a main lead 1000 forms a second water-tight joint between a first end of the second lead tube 606 and the second segment 304. In a fifth step 1010, the method of repairing a main lead 1000 forms a third water-tight joint between a second end of the first lead tube 604 and a tang 602 after the formation of the first water-tight joint. In a sixth step 1012, the method of repairing a main lead 1000 forms a fourth water-tight joint between a second end of the second lead tube 908 and the tang 602 after the formation of the second water-tight joint, the tang 602, the first lead tube 604, the second lead tube 606, the first segment 302, and the second segment 304 cooperating to provide fluid communication and an electrical connection between the tang 602, the first segment 302, and the second segment 304.

The replacement of a main lead will be described with regard to the main lead 204 of FIG. 5. However, the method described is equally applicable to any other main lead. In order to replace the main lead 204, the main lead 802, or any other main lead one begins by cutting the parallel ring 202 attached to the main lead 204 to divide the parallel ring 202 into the first segment 302 and the second segment 304. In addition, any additional lead tubes 308 are cut to completely separate the main lead 204 from the turbogenerator 100.

Each of the first lead tube 604, the second lead tube 606, and the third lead tube 608 or any other lead tube if needed, are pre-manufactured with the desired final shape. The size and shape of each of the lead tubes may be adjusted to allow for the use of cylindrical spigots, or other attachment devices or adaptors that are attached to the first ends of the tubes to facilitate connection. In the illustrated arrangement, a braze joint is employed to attach each spigot to the respective first ends of the tubes. The use of the spigot, or another fitting allows for a better braze joint by avoiding a straight butt joint braze. It should be noted that other constructions may employ other attachment means including but not limited to threads, welding, adhesives, and the like.

With the spigots installed in the tubes, the installation can begin. The first end of the first lead tube 604 is positioned as desired relative to the first segment 302 while properly positioning the second end. The first end is then either temporarily attached or permanently attached to the first segment 302. The same process is then performed with the second lead tube 606. Finally, if there is a third lead tube 608 or even more lead tubes, they are likewise positioned so that the first end can be attached in its desired operating position such that the second end is free and positioned in its desired operating position.

After the first ends of the first lead tube 604, the second lead tube 606, and the third lead tube 608 are attached in their operating position (either permanently or temporarily) the second ends can be attached to the tang 602. Because the tubes were preformed and properly positioned, the tang 602 is simply positioned to receive the second ends of the tubes and the second ends are attached. If the first ends are temporarily attached, those joints can be made permanent at any point in the process.

As discussed, braze joints assure a water-tight joint between the tubes, the parallel rings 202, the tang 602, or any other components.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A generator comprising:
   a stator core defining a first end and a second end;
   a plurality of stator bars disposed within the stator core, each stator bar including a coolant flow path;
   a parallel ring having a first segment and a second segment separate from the first segment, the parallel ring coupled to the first end of the stator core and arranged to electrically connect the plurality of stator bars and to fluidly connect the coolant flow paths of the plurality of stator bars;
   a tang including a main chamber, a first coolant opening, and a second coolant opening, the main chamber fluidly interconnecting the first coolant opening and the second coolant opening;
   a first lead tube having a first lead end connected to the first coolant opening and a second lead end connected to the first segment;
   a second lead tube separate from the first lead tube and having a first lead end connected to the second coolant opening and a second lead end connected to the second segment, the plurality of stator bars, the parallel ring, the tang, the first lead tube, and the second lead tube cooperating to define a portion of a circuit and a portion of a cooling path; and
   a third lead tube, separate from the first lead tube and the second lead tube, the third lead tube including a first end connected to the tang.

2. The generator of claim 1, wherein the tang includes a third coolant opening, and wherein the tang provides fluid communication between the main chamber and each of the first coolant opening, the second coolant opening, and the third coolant opening.

3. The generator of claim 1, wherein the third lead tube provides fluid communication and an electrical connection between the tang and one of a stator bar and a second parallel ring.

4. The generator of claim 1, wherein the first lead tube and the second lead tube are each insulated separately to define a space therebetween.

5. The generator of claim 1, wherein the first lead end is connected to the first coolant opening using one of a brazing and welding process.

6. The generator of claim 1, wherein the tang one of receives a flow of coolant at the main chamber and directs the flow of coolant to the first segment and the second segment via the first lead tube and the second lead tube, and collects the flow of coolant from the first segment and the second segment via the first lead tube and the second lead tube for discharge from the tang via the main chamber.

7. A generator comprising:
a main lead assembly including:
a tang;
a first lead tube cooperating with the tang to define a first water-tight joint and a first free end;
a second lead tube separate from the first lead tube cooperating with the tang to define a second water-tight joint and a second free end; and
a third lead tube that cooperates with the tang to define a third water-tight joint and a third free end wherein the third free end is connectable to one of a stator bar and a second parallel ring;
wherein the first free end is connectable to a first segment of a parallel ring and the second free end is connectable to a second segment of the parallel ring.

8. The generator of claim 7, further comprising a first insulation layer applied to the first lead tube and a second insulation layer applied to the second lead tube, the first insulation layer and the second insulation layer being separate from one another.

9. The generator of claim 8, further comprising positioning the first lead tube and the second lead tube to define a space between the first insulation layer and the second insulation layer.

10. The generator of claim 7, wherein the first water-tight joint is formed using one of a brazing and a welding process.

11. The generator of claim 7, wherein the first lead tube and the second lead tube are formed from one of copper and a copper alloy.

12. A method of repairing a water-cooled stator for a generator, the method comprising:
removing an existing main lead assembly by cutting a parallel ring that is connected to the existing main lead assembly, the removal of the existing main lead assembly dividing the parallel ring into a first segment and a second segment;
preforming a first lead tube to a first desired shape and a second lead tube to a second desired shape, the first lead tube and the second lead tube being completely separate from one another;
forming a first water-tight joint between a first end of the first lead tube and the first segment;
forming a second water-tight joint between a first end of the second lead tube and the second segment;
forming a third water-tight joint between a second end of the first lead tube and a tang after the formation of the first water-tight joint;
forming a fourth water-tight joint between a second end of the second lead tube and the tang after the formation of the second water-tight joint, the tang, the first lead tube, the second lead tube, the first segment, and the second segment cooperating to provide fluid communication and an electrical connection between the tang, the first segment, and the second segment.

13. The method of claim 12, wherein at least one of the forming steps includes performing one of a brazing and a welding operation.

14. The method of claim 12, wherein the third water-tight joint is formed after the formation of the first water-tight joint and the second water-tight joint.

15. The method of claim 14, wherein the fourth water-tight joint is formed after the formation of the first water-tight joint, the second water-tight joint, and the third water-tight joint.

16. The method of claim 12, further comprising forming a fifth water-tight joint between a third lead tube and one of a stator bar and a second parallel ring.

17. The method of claim 12, further comprising adding an insulation layer to each of the first lead tube and the second lead tube, the insulation layers for the second lead tube being separate from the insulation layers of the first lead tube.

18. The method of claim 12, further comprising positioning the first lead tube and the second lead tube to define a space therebetween.

* * * * *